(12) United States Patent
Aonuma

(10) Patent No.: US 8,717,629 B2
(45) Date of Patent: May 6, 2014

(54) IMAGE-PROCESSING DEVICE

(75) Inventor: Koki Aonuma, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1293 days.

(21) Appl. No.: 12/056,584

(22) Filed: Mar. 27, 2008

(65) Prior Publication Data

US 2008/0285083 A1 Nov. 20, 2008

(30) Foreign Application Priority Data

Mar. 30, 2007 (JP) ................................ 2007-095573

(51) Int. Cl.
- *G06K 15/02* (2006.01)
- *G06K 15/00* (2006.01)
- *H04N 1/405* (2006.01)
- *G06K 9/44* (2006.01)

(52) U.S. Cl.
USPC ............. 358/2.99; 358/1.2; 358/1.9; 358/2.1; 358/3.01; 358/3.1; 358/3.21; 382/258

(58) Field of Classification Search
None
See application file for complete search history.

(56) References Cited

U.S. PATENT DOCUMENTS

| | | | |
|---|---|---|---|
| 4,308,553 A | 12/1981 | Roetling | |
| 4,520,505 A * | 5/1985 | Yamamoto et al. | 382/258 |
| 5,153,576 A | 10/1992 | Harrington | |
| 5,485,288 A | 1/1996 | Kamei et al. | |
| 5,608,547 A * | 3/1997 | Nakatani et al. | 358/505 |
| 5,691,827 A | 11/1997 | Kamei et al. | |
| 5,701,401 A | 12/1997 | Harrington et al. | |
| 6,057,932 A * | 5/2000 | Yoshida et al. | 358/1.9 |
| 6,179,485 B1 | 1/2001 | Harrington | |
| 6,204,934 B1 | 3/2001 | Minamino | |
| 6,473,201 B1 * | 10/2002 | Sato | 358/1.9 |
| 6,760,123 B1 | 7/2004 | Harrington et al. | |
| 7,339,699 B1 * | 3/2008 | Suzuki et al. | 358/1.9 |
| 7,443,538 B2 * | 10/2008 | Hasegawa | 358/1.9 |
| 2002/0163660 A1 * | 11/2002 | Iwai | 358/1.13 |
| 2005/0046688 A1 * | 3/2005 | Lapstun et al. | 347/109 |
| 2005/0174587 A1 * | 8/2005 | Hara | 358/1.9 |
| 2005/0206937 A1 * | 9/2005 | Hirabayashi | 358/1.13 |
| 2005/0280873 A1 | 12/2005 | Noel | |

(Continued)

FOREIGN PATENT DOCUMENTS

| | | |
|---|---|---|
| JP | H04-275768 | 10/1992 |
| JP | H04-351172 | 12/1992 |

(Continued)

OTHER PUBLICATIONS

Japanese Official Action dated Sep. 24, 2009 with English language translation.

*Primary Examiner* — King Poon
*Assistant Examiner* — Beniyam Menberu
(74) *Attorney, Agent, or Firm* — Scully, Scott, Murphy & Presser, PC

(57) ABSTRACT

An image-processing method includes: acquiring multi-level tone print data expressed in multi-level tones; determining whether the acquired multi-level tone print data includes line data indicative of a line having a tone; replacing, if the print data includes the line data, the line data with specific line data based on the tone of the line data, the specific line data indicating a specific line having a prescribed tone value and a prescribed structure; and converting the multi-level tone print data to binary data after replacing the line data with the specific line data.

20 Claims, 7 Drawing Sheets

(56) References Cited

U.S. PATENT DOCUMENTS

| | | | |
|---|---|---|---|
| 2006/0132855 A1* | 6/2006 | Dokuni et al. | 358/448 |
| 2007/0133020 A1* | 6/2007 | Uejo et al. | 358/1.9 |
| 2007/0236707 A1* | 10/2007 | Shoda | 358/1.2 |
| 2007/0236739 A1* | 10/2007 | Murakami et al. | 358/3.06 |

FOREIGN PATENT DOCUMENTS

| | | | | |
|---|---|---|---|---|
| JP | H05-130439 | | 5/1993 | |
| JP | 05-219354 | * | 8/1993 | ............. H04N 1/387 |
| JP | 7-152904 | | 6/1995 | |
| JP | 8-238838 | | 9/1996 | |
| JP | H10-151812 | | 6/1998 | |
| JP | 2000-108447 | * | 4/2000 | ............... B41J 21/00 |
| JP | 2001-239721 | * | 9/2001 | ............... B41J 29/26 |
| JP | 2001-352454 | | 12/2001 | |
| JP | 2004-236157 | | 8/2004 | |
| JP | 2006-25229 | | 1/2006 | |
| JP | 2006-270567 | * | 10/2006 | ............... H04N 1/52 |

* cited by examiner

FIG.2

SPECIFIC LINE DATA TABLE

| LINE NUMBER | SPECIFIC LINE DATA |
|---|---|
| 0 | +1pt SOLID LINE |
| 1 | 1pt SOLID LINE |
| 2 | 1pt DASHED LINE |
| 3 | 0.5pt SOLID LINE |
| ⋮ | ⋮ |
| 25 | 0.1pt DOTTED LINE |

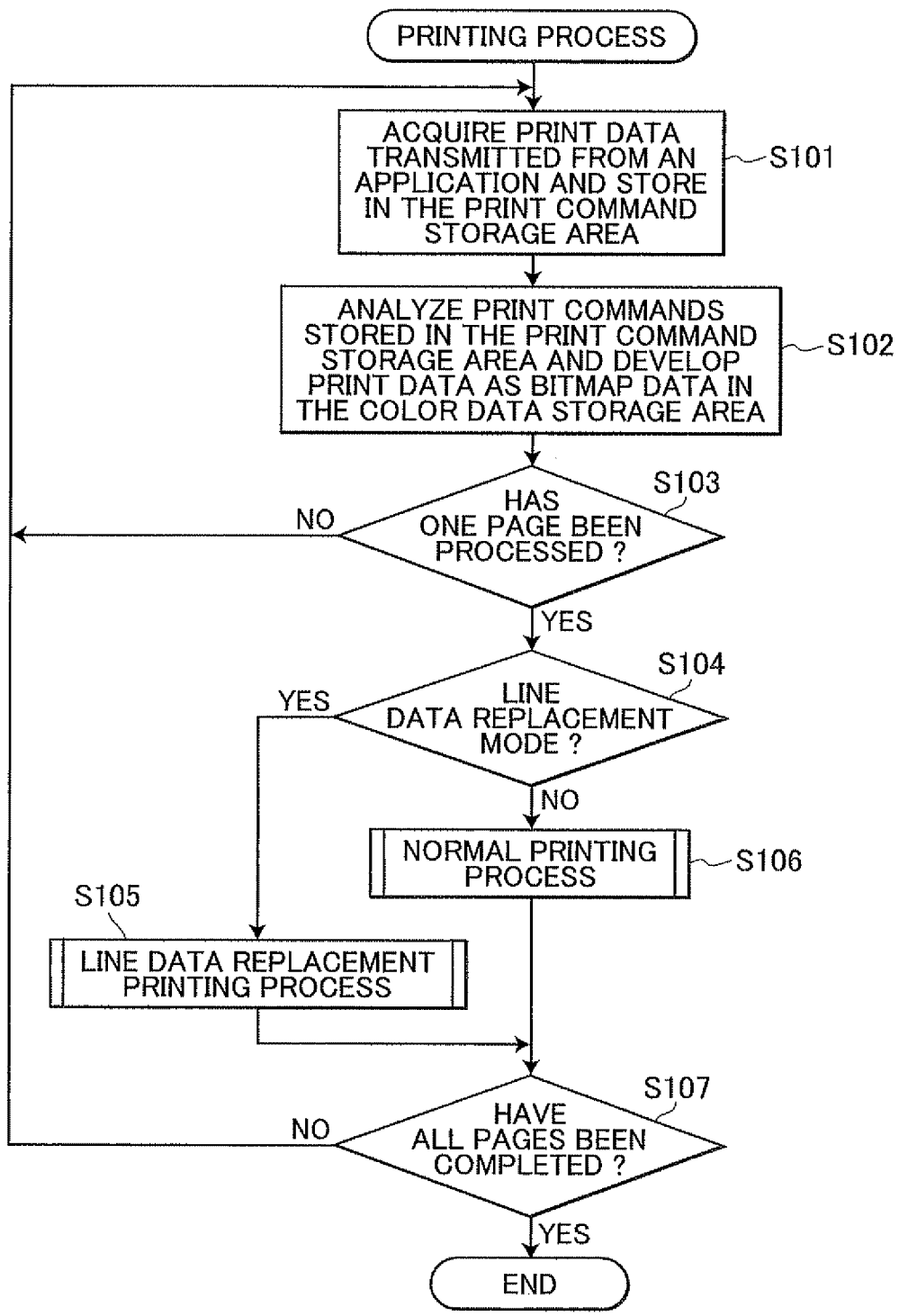

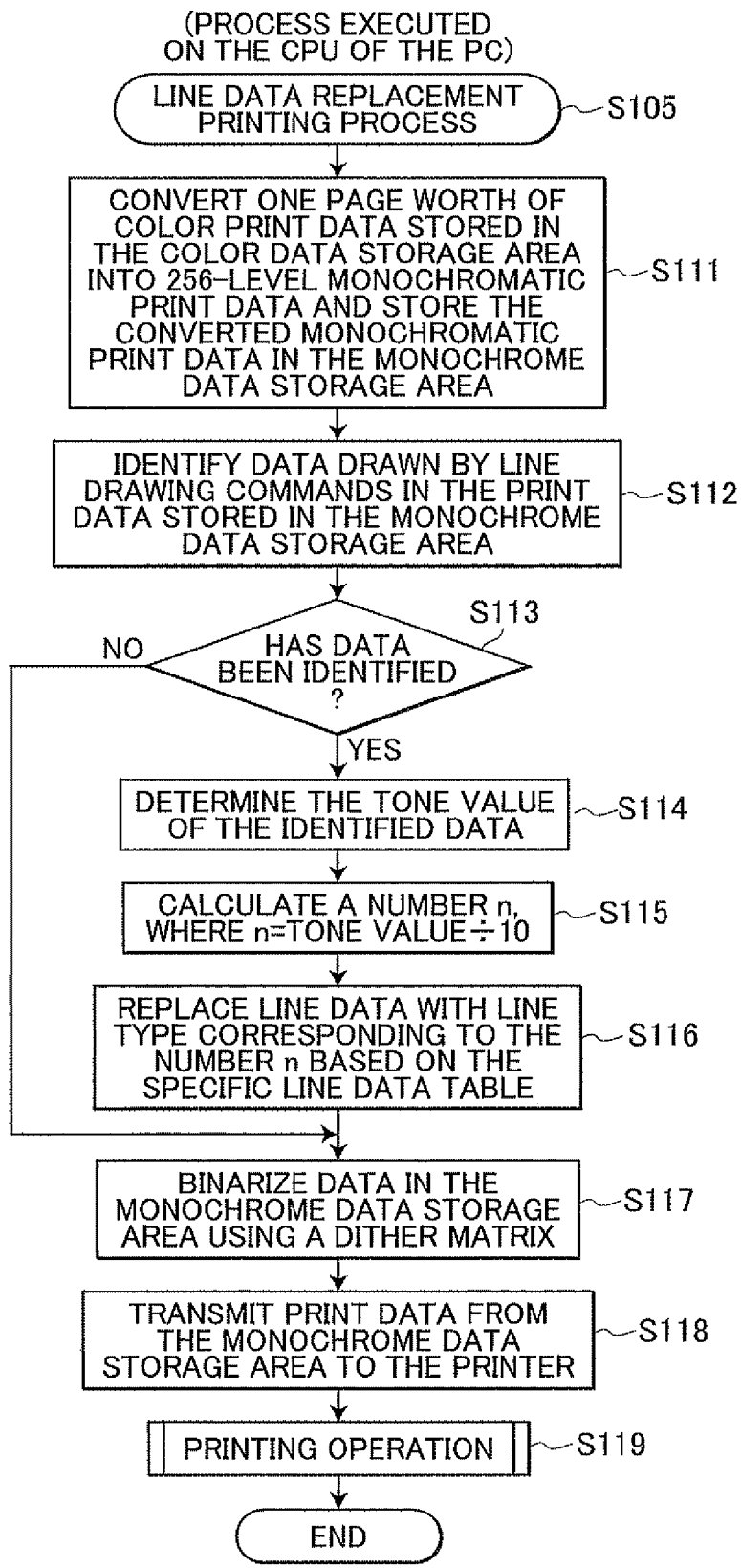

FIG.6(a)

TABLE OF LINE COLORS SORTED BY GROUP

| GROUP | LINE COLOR |
|---|---|
| G1 (DARK) | BLACK, RED, BLUE, ⋯ |
| G2 (MEDIUM) | PINK, ⋯ |
| G3 (LIGHT) | YELLOW, ⋯ |

FIG.6(b)

SPECIFIC LINE DATA TABLE FOR G1

| LINE NUMBER | SPECIFIC LINE DATA |
|---|---|
| 0 | +1pt SOLID LINE |
| 1 | 1pt SOLID LINE |
| 2 | 1pt DASHED LINE |
| ⋮ | ⋮ |

FIG.6(c)

SPECIFIC LINE DATA TABLE FOR G2

| LINE NUMBER | SPECIFIC LINE DATA |
|---|---|
| 0 | 1pt SOLID LINE |
| 1 | 0.5pt SOLID LINE |
| 2 | 1pt DASHED LINE |
| ⋮ | ⋮ |

FIG.6(d)

SPECIFIC LINE DATA TABLE FOR G3

| LINE NUMBER | SPECIFIC LINE DATA |
|---|---|
| 0 | 1pt DOTTED LINE |
| 1 | 1pt DASHED-AND-DOTTED LINE |
| 2 | 0.5pt DASHED-AND-DOTTED LINE |
| ⋮ | ⋮ |

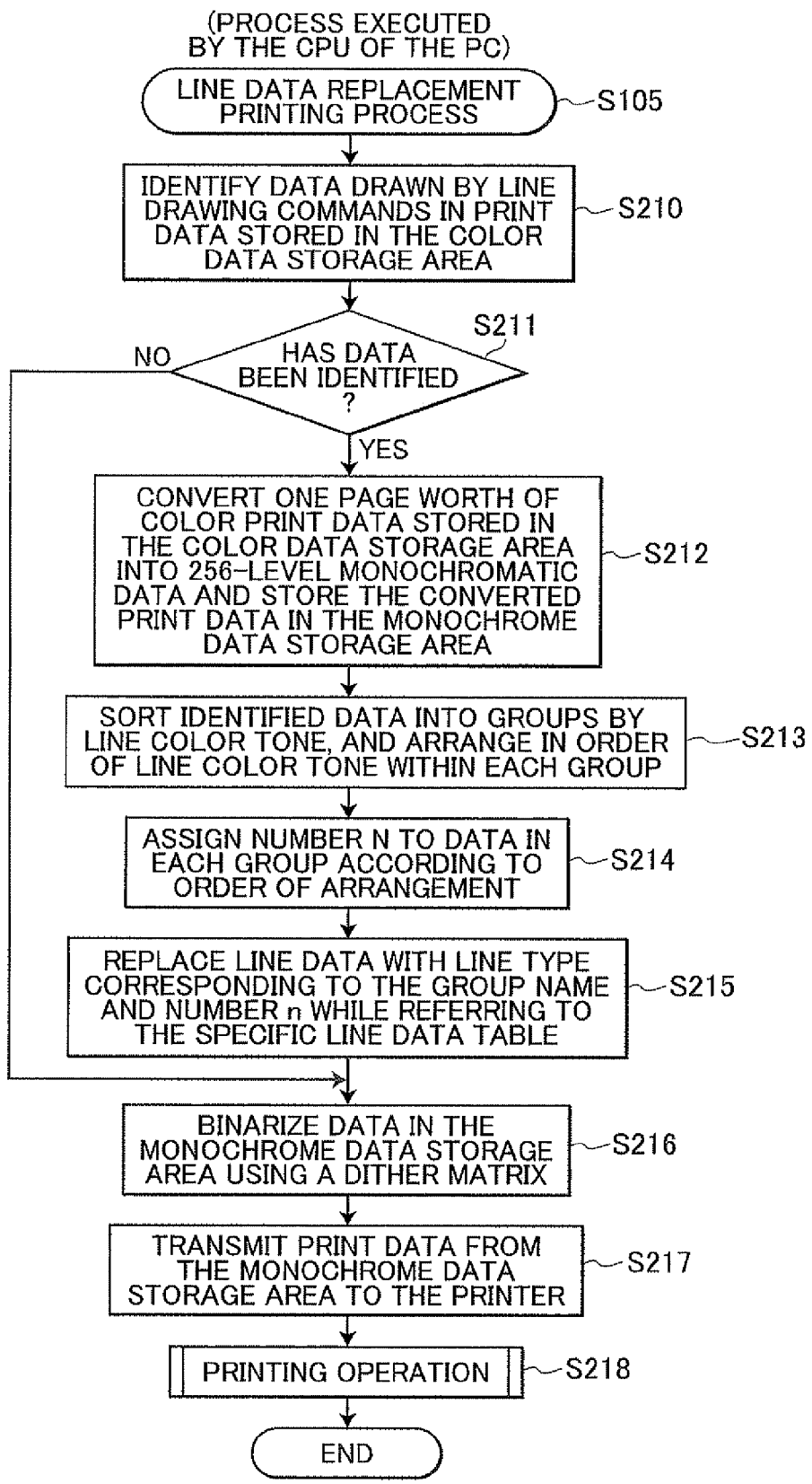

IMAGE-PROCESSING DEVICE

CROSS REFERENCE TO RELATED APPLICATION

This application claims priority from Japanese Patent Application No. 2007-95573 filed Mar. 30, 2007. The entire content of this priority application is incorporated herein by reference.

TECHNICAL FIELD

The present invention relates to an image processing method and an image processor.

BACKGROUND

Japanese unexamined patent application publication No. 2006-25229 describes a drawing process performed by a printer driver. In this drawing process, the printer driver converts color print data to monochromatic print data when the print setting is monochromatic. First, the printer driver acquires a draw command. If the drawing instruction according to the acquired draw command is an instruction for converting print data to monochromatic data, the printer driver determines whether the print data itself is monochromatic. If the print data is not monochromatic, but color, the printer driver converts the print data to gray values. Since black text and color text are drawn in different achromatic tones as a result, the user can distinguish the different colors of the original image.

Further, recent printer drivers generally create binarized print data using an area gradation method employing a dither matrix to render print densities. The printer driver divides the print data into blocks of a plurality of pixels and applies a preset dither matrix to the block divisions to form print data.

SUMMARY

However, when producing print data with a dither matrix, the following problem can arise. When multi-level print data for lines is converted to binary print data for lines to render intermediate tones, some pixels in the line may fall within printing regions and others within non-printing regions depending on the multi-level tone values and the position at which the dither matrix is applied, resulting in different drawings for lines of the same tone values. In other words, lines having the same tone values may be depicted differently depending on their drawing positions, in some cases not being drawn or being depicted as dotted lines. Accordingly, it is difficult to convert multi-level print data to binary print data having regularity with respect to the multi-level print data using a dither matrix, particularly in the case of narrow lines.

In view of the foregoing, it is an object of the present invention to provide an image-processing method and an image processor capable of converting, with a dither matrix, multi-level print data of lines to binary print data having regularity relative to the multi-level print data.

In order to attain the above and other objects, the invention provides an image-processing method including: acquiring multi-level tone print data expressed in multi-level tones; determining whether the acquired multi-level tone print data includes line data indicative of a line having a tone; replacing, if the print data includes the line data, the line data with specific line data based on the tone of the line data, the specific line data indicating a specific line having a prescribed tone value and a prescribed structure; and converting the multi-level tone print data to binary data after replacing the line data with the specific line data.

According to another aspect, the invention provides a computer readable medium storing a set of program instructions executable on a data processing device, instructions including: acquiring multi-level tone print data expressed in multi-level tones; determining whether the acquired multi-level tone print data includes line data indicative of a line having a tone; replacing, if the print data includes the line data, the line data with specific line data based on the tone of the line data, the specific line data indicating a specific line having a prescribed tone value and a prescribed structure; and converting the multi-level tone print data to binary data after replacing the line data with the specific line data.

According to another aspect, the invention provides an image-processing device including: an multi-level tone print data acquiring unit; a determining unit; a replacing unit; and a converting unit. The multi-level tone print data acquiring unit acquires multi-level tone print data expressed in multi-level tones. The determining unit determines whether the acquired multi-level tone print data includes line data indicative of a line having a tone. The replacing unit replaces. If the print data includes the line data, the line data with specific line data based on the tone of the line data, the specific line data indicating a specific line having a prescribed tone value and a prescribed structure. The converting unit converts the multi-level tone print data to binary data after replacing the line data with the specific line data.

BRIEF DESCRIPTION OF THE DRAWINGS

In the drawings:

FIG. 2 is an explanatory diagram conceptually illustrating a specific line data table;

FIG. 3 is a flowchart illustrating steps in a printing process executed by a CPU of the PC;

FIG. 4 is a flowchart illustrating steps in a line data replacement printing process executed by the CPU of the PC;

FIG. 5(*b*) is a result of printing the original image according to a normal printing process;

FIG. 5(*c*) is a result of printing the original image according to the line data replacement printing process;

FIG. 6(*a*) is an explanatory diagram conceptually illustrating a table for sorting line colors into groups according to a second embodiment of the present invention;

FIGS. 6(*b*)-6(*d*) are specific line data tables for respective groups according to the second embodiment; and FIG. 7 is a flowchart illustrating steps in a line data replacement printing process executed by the CPU of the PC according to the second embodiment.

DETAILED DESCRIPTION

Next, embodiments of the present invention will be described while referring to the accompanying drawings.

First, a first embodiment of the present invention will be described while referring to FIGS. 1-5(*c*).

Figure 1:
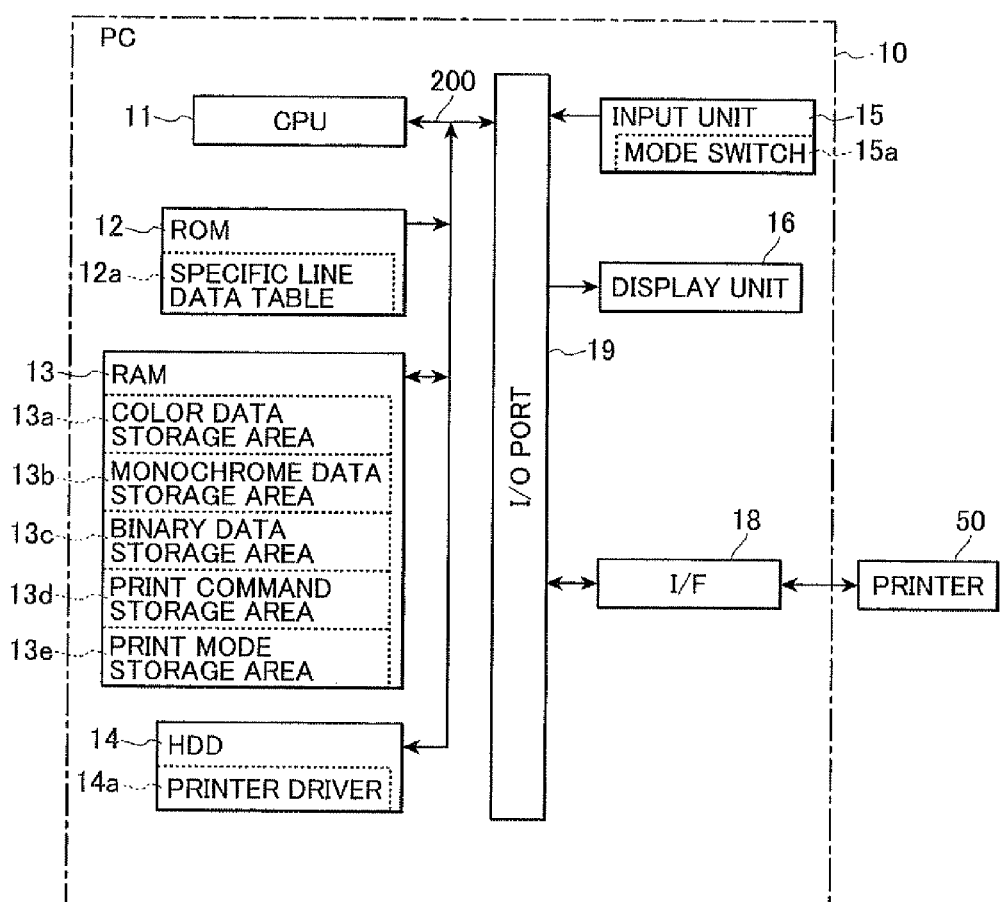
FIG. 1 is a block diagram showing the overall structure of an image-forming system including a personal computer on which an image-processing program of an embodiment is installed.

FIG. 1 is a block diagram showing the overall structure of an image-forming system including a personal computer (hereinafter abbreviated to "PC") 10 on which an image-processing program according to the first embodiment is installed. The image-forming system shown in FIG. 1 also includes a printer 50 connected to the PC 10.

As shown in FIG. 1, the PC 10 includes a CPU 11, a ROM 12, a RAM 13, and a hard disk drive (hereinafter abbreviated to "HDD") 14, all connected via a bus line 200. The bus line 200 is also connected to an I/O port 19. The I/O port 19 is connected to an input device 15 having a mode switch 15a, a display unit 16, and an interface 18 for connecting the PC 10 to the printer 50.

The CPU 11 is a central processing unit for performing overall control of the PC 10. The CPU 11 executes control programs for implementing the processes shown in the flowcharts of FIGS. 3 and 4, for example.

The ROM 12 is a read-only memory for storing the control programs executed by the CPU 11, including the control programs of FIGS. 3 and 4, and various data required when the CPU 11 executes these control programs. It is noted that the control programs of FIGS. 3 and 4 may be stored in the HDD 14. The control programs of FIGS. 3 and 4 may be first stored in a data storage medium such as a CD-ROM, and the like and then loaded to the PC 10. The control programs of FIGS. 3 and 4 may be downloaded from the network, such as the Internet, to the PC 10.

The ROM 12 includes a specific line data table 12a having a plurality of specific line data.

Here, the specific line data table 12a of the ROM 12 will be described with reference to FIG. 2. FIG. 2 is an explanatory diagram conceptually illustrating the specific line data table 12a.

As shown in FIG. 2, the specific line data table 12a stores 26 sets of specific line data in association with line numbers of 0 to 25. The specific line data indicates, in association with each line number, a type and thickness of a specific line that should be used to replace line data drawn by line drawing commands to be described later.

For example, the specific line data table 12a stores "line number 0" with "+1 pt solid line," "line number 1" with, "1 pt solid line," "line number 2" with "1 pt dashed line," "line number 3" with "0.5 pt solid line," . . . , and "line number 25" with "0.1 pt dotted line."

In the embodiment, "pt" is a unit indicating the line thickness or width, where "+1 pt" is the maximum thickness for a printed (drawn) line and "0.1 pt" is the minimum thickness. In other words, a line with +1 pt is the thickest (widest) line, while a line with 0.1 pt is the thinnest (narrowest) line. The maximum thickness "+1 pt line" is 1-5 pt, for example.

"Solid line" indicates an unbroken printed line. The specific line data for a solid line indicates that all the pixels making up the line have the darkest or minimum multi-level tone value (0). "Dashed line" indicates a line having spaces (non-printed regions) between printed line segments. The specific line data for a dashed line indicates that pixels making up the line segments have the darkest or minimum multi-level tone value (0) and pixels making up the spaces have the lightest or largest multi-level tone value (255). "Dotted line" indicates a line having spaces (non-printed regions) between printed dots. Similarly to the specific line data for a dashed line, the specific line data for a dashed line indicates that pixels making up the dots have the darkest or minimum multi-level tone value (0) and pixels making up the spaces have the lightest or largest multi-level tone value (255).

As apparent from FIG. 2, the smaller the line number in the specific line data table 12a, the thicker the line and, conversely, the larger the line number, the thinner the line. In addition, solid lines have smaller line numbers than dashed lines and dotted lines, with the number of spaces between dashes or dots increasing as the line number increases. In the embodiment, the value of the line number decreases as the tone value of line data decreases (approaches black) as will be described later.

Next, the RAM 13 will be described with reference to FIG. 1. The RAM 13 functions to temporarily store data and programs required in various processes implemented by the CPU 11. The RAM 13 is provided with a color data storage area 13a, a monochrome data storage area 13b, a binary data storage area 13c, a print command storage area 13d, and a print mode storage area 13e.

The CPU 11 stores print data (print commands, bitmap data, drawing instructions, and other data) received from an application running on the printer 50 in the print command storage area 13d-Subsequently, the CPU 11 analyzes the commands stored in the print command storage area 13d, converts the print data (instructions and the bitmap data) to multi-level tone color print data (bitmap data), and stores this data in the color data storage area 13a. The color data storage area 13a of the embodiment can store one page worth of multi-level tone color print data.

An example of print data transmitted to the print command storage area 13d is data created by an application, such as common word-processing software, spreadsheet software, or graphic design software, and includes drawing instructions indicating whether print data created by the application is an image, text, or lines. It is noted that a line drawing instruction includes: positional data indicative of positions of end points between which a line should be drawn; and color data indicative of color in which the line should be drawn.

Multi-level tone color print data stored in the color data storage area 13a is in a bitmap format and includes color pixel data defining each pixel in R (red), G (green), and B (blue) values, each of the R, G, and B values being expressed in a plurality of tone levels.

In the process of FIG. 3 described later, the CPU 11 converts the multi-level tone color print data stored in the color data storage area 13a into multi-level tone monochromatic print data based on a predetermined relationship between color data and monochromatic data. The multi-level tone monochromatic print data is also in a bitmap format, and includes monochromatic pixel data defining each pixel in a tone value expressed in 256 levels, from 0 to 255. The CPU 11 stores the converted multi-level tone monochromatic print data in the monochrome data storage area 13b.

As will be described later, when a line data replacement mode is being set for replacing line data in the print data with specific line data, the CPU 11 replaces the line data stored in the monochrome data storage area 13b with specific line data, while referencing the specific line data table shown in FIG. 2. It is noted that line data is defined as multi-level tone monochromatic print data for pixels constituting a line.

The CPU 11 uses a dither matrix to binarize the multi-level tone monochromatic data stored in the monochrome data storage area 13b and stores resultant binarized print data in the binary data storage area 13c. The CPU 11 subsequently transmits the binary print data from the binary data storage area 13c to the printer 50 via the interface 18 to be printed on the printer 50.

The PC 10 performs a process using the dither matrix for converting multi-level data to binary print data. The dither matrix is a 16×16 matrix, for example, wherein each element of the matrix is set to a threshold value for converting the tone value of each pixel to a "1" or a "0". In the binarization process, the CPU 11 first divides all pixels of the print data into blocks of equal size with the dither matrix. The dither matrix is then superimposed over (applied to) each block of pixels, and the CPU 11 sets each pixel to a "1" or "0" by comparing the tone value of each pixel to the threshold value set in the corresponding element of the dither matrix. By comparing each pixel in a block division to the threshold value of the corresponding element in the dither matrix, the CPU 11 produces "1" or "0" corresponding to the tone value of the original pixel based on a fixed rule and can simulate intermediate tones based on the occurrence rate of "1" values. Further, since black or darkest tone (the smallest tone value) is rendered by filling in the entire dither matrix, line data converted to black or darkest tone (solid lines) is reliably printed. Similarly, since white or lightest tone (the largest tone value) is rendered by not filling in the dither matrix entirely, line data converted to black or darkest tone and white or lightest tone (dashed lines and dotted lines) is also reliably printed.

The print mode storage area 13e stores a value corresponding to the mode switched by the mode switch 15a. In the embodiment, there are two modes that can be selected by the user: a normal mode and a line data replacement mode.

The HDD 14 is a rewriteable storage device and stores a printer driver 14a capable of generating print data that can be printed on the printer 50. The printer driver 14a is provided with data of the dither matrix.

The input device 15 enables the user of the PC 10 to input data or commands and is configured of a keyboard, mouse, and the like. As described above, the mode switch 15a is provided on the input device 15. However, the user may be allowed to set the normal mode or line data replacement mode using the keyboard or the like of the input device 15.

The display unit 16 displays text, images, and the like allowing the user of the PC to visually confirm details of processes executed by the PC 10, inputted data, and the like. The display unit 16 may be configured of a CRT display or a liquid crystal display, for example.

The interface 18 functions to connect the PC 10 to the printer 50, enabling the PC 10 to transmit binarized image data to the printer 50 in order to form monochromatic images therewith.

While the example in FIG. 1 shows a single PC 10 connected directly to the printer 50, the image-forming system may be configured of a plurality of PC 10 sharing a single printer 50 via a network. Here, the interface may be any format, such as USB, Ethernet (registered trademark), or wireless LAN.

Next, a printing process executed by the CPU 11 of the PC 10 will be described with reference to FIG. 3. FIG. 3 is a flowchart illustrating steps in the printing process. The printing process begins when the user performs an operation on the input device 15 to initiate printing of a desired image.

In S101 at the beginning of the printing process, the CPU 11 acquires print data, including draw commands, transmitted from an application on the printer 50 and stores this data in the print command storage area 13d.

In S102 the CPU 11 analyzes the draw commands, and develops the print data into multi-level tone color print data (bitmap data) in the color data storage area 13a.

While the color data storage area 13a can store one page worth of print data in the embodiment, the capacity of the color data storage area 13a may be changed based on the volume of data to be transmitted to the printer 50 or the performance of the PC.

After developing the print data into multi-level tone color print data (bitmap data) in S102, in S103 the CPU 11 determines whether the developed print date has reached one page worth.

If one page worth of print data has not yet been processed (S103: NO), the CPU 11 returns to S101 and repeats the process to acquire, analyze, and develop print data transmitted from the application.

However, when one page worth of print data has been processed (S103 YES), in S104 the CPU 11 determines whether the mode stored in the print mode storage area 13e is the line data replacement mode.

If the mode stored in the print mode storage area 13e is the line data replacement mode (S104:YES), in S105 the CPU 11 executes a line data replacement printing process. However, if the mode stored in the print mode storage area 13e is the normal mode (S104: NO), then in S106 the CPU 11 executes a normal printing process. After performing S105 or S106, the CPU 11 returns to S101 and repeatedly performs the process in S101-S105 or S101-S106 while all pages of print data have not yet been processed (S107: NO).

Next, the line data replacement printing process of S105 will be described in greater detail with reference to FIG. 4.

FIG. 4 is a flowchart illustrating steps in the line data replacement printing process executed by the CPU 11 of the PC 10. In this process, the PC 10 binarizes the multi-level tone monochromatic print data stored in the monochrome data storage area 13b using the dither matrix, after replacing line data in the multi-tone level tone monochromatic print data with specific line data corresponding to tone values of the line data while referencing the specific line data table 12a.

In S111 at the beginning of the line data replacement printing process, the CPU 11 converts one page worth of multi-level tone color print data (bitmap data), which is acquired in S101 of FIG. 3 and which is stored in the color data storage area 13a, to 256-level tone monochromatic print data (bitmap data) and stores the converted 256-level tone monochromatic print data in the monochrome data storage area 13b.

In S112 the CPU 11 acquires line drawing commands stored in the print command storage area 13d, analyzes the positional data included in the line drawing commands, and identifies areas where lines have been drawn according to the line drawing commands within the entire part of the one page worth of the 256-level tone monochromatic print data (bitmap data) that is now stored in the monochrome data storage area 13b.

In S113 the CPU 11 determines whether there is identified some area drawn by the line drawing commands.

If the CPU 11 identifies no areas drawn by the acquired line drawing commands (no in S113), then the CPU 11 jumps to S117.

If the CPU 11 identifies some area drawn by the line drawing commands (which will be referred to as "line area" hereinafter) (yes in S113), then the CPU 11 proceeds to S114. Portions of the 256-level tone monochromatic print data that are stored in the monochrome data storage area 13b and that correspond to the line areas are defined as "line data".

In S114 the CPU 11 determines a tone value indicative of a tone or density in which the line area should be drawn according to the line drawing commands. The CPU 11 determines the tone value as either one of 256 tone levels of 0 to 255.

In this example, the CPU 11 determines the tone value of the line area based on the color data included in the line drawing commands. However, the CPU 11 may determine the tone value of the line area by reading multi-level tone color print data from the color data storage area 13a for the line area, and by determining the tone value of the line area based on color data contained in the read multi-level tone color print data. Or, the CPU 11 may determine the tone value of the line area by reading line data (256-level tone monochromatic print data for the line area) from the monochrome data storage area 13a, and by determining the tone value of the line area based on the read out 256-level tone monochromatic print data.

In S115 the CPU 11 finds the number n to obtain the correlation between the line data and the specific line data for replacement.

More specifically, the CPU 11 calculates the number n by dividing the tone value acquired in S114 by 10. The result obtained by this division is rounded off at the decimal point in the embodiment. Accordingly, since tone values range from 0 to 255, the value of the number n ranges from 0 to 25. The process of S115 therefore sorts the tone value indicative of the tone or density of the line data in the range of 0-255 into the smaller range of 0-25.

After calculating the number n in S115, in S116 the CPU 11 replaces the line data in the multi-level tone monochromatic print data (bitmap data), which is drawn by the line drawing commands and which is stored in the monochrome data storage area 13k, with specific line data that is associated with the line number corresponding to the number n, by referencing the specific line data table 12a. Thus, the CPU 11 redraws lines in the monochrome data storage area 13b by using the specific line data. The thus redrawn lines are formed by pixels whose multi-level tone monochromatic data has either one of 0 (black or darkest) or 255 (white or lightest).

In S117 the CPU 11 uses the dither matrix to binarize the 256-level tone monochromatic print data stored in the monochrome data storage area 13b. As mentioned earlier, black or darkest tone (the smallest tone value) is rendered by filling in the entire dither matrix, and white or lightest tone (the largest tone value) is rendered by not filling in the dither matrix entirely, thereby reliably printing lines of the specified types (solid, dashed, dotted, and the like) based on the replaced specific line data. Accordingly, the PC 10 can reliably print binarized print data.

In S118 the CPU 11 transmits the binarized monochromatic print data stored in the monochrome data storage area 13b to the printer 50, in S119 executes a printing process with this print data, and subsequently ends the line data replacement printing process.

Next, the normal printing process of S106 (FIG. 3) will be described.

In the normal printing process of S106, the CPU 11 converts multi-level tone color print data into 256 level tone monochromatic print data, converts the 256-level tone monochromatic print data into binary monochromatic print data using the dither matrix, transmits the binary monochromatic print data to the printer 50, and executes a printing process with the print data. The CPU 11 does not replace line data in the multi-level tone monochromatic print data with specific line data, contrarily to the line data replacement printing process of S105. In other words, in this normal printing process, the CPU 11 executes the processes the same as the processes of S111, S117, S118, and S119 in the line data replacement printing process of S105.

Next, an example printing operation according to the process in FIG. 3 will be described with reference to FIGS. 5(a)-5(c).

Figure 5A:
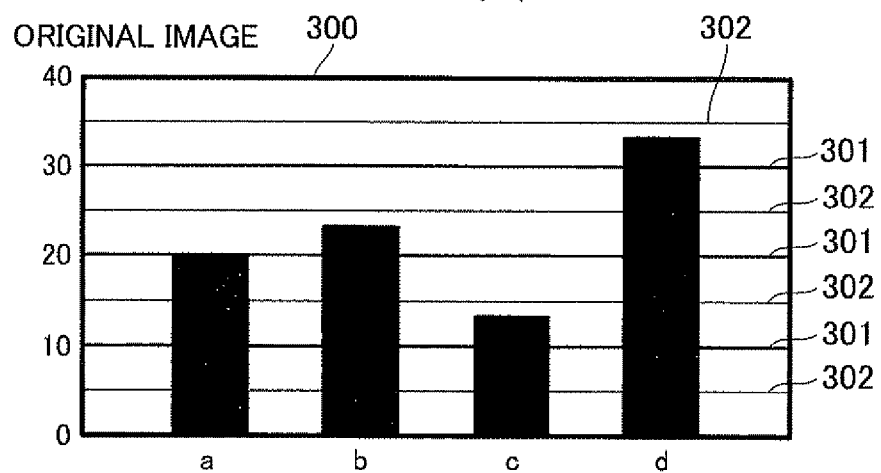
FIG. 5(*a*) is an explanatory diagram showing a sample original image prior to printing.

FIG. 5(a) shows an example of an original image prior to printing. FIGS. 5(b) and 5(c) show examples of printed results based on the original image of FIG. 5(a) when performing a normal printing process (FIG. 5(b)) and a line data replacement printing process (FIG. 5(c)).

FIG. 5(a) shows an original image displayed on a display screen (not shown) of the display unit 16. FIG. 5(b) shows results of printing the original image according to the normals printing process of S105. FIG. 5(c) shows the results of printing the original image after replacing line data in the line data replacement printing process of S104. For convenience of description, the display screen on which the original image is displayed in FIG. 5(a) and the recording paper on which the data is printed in FIGS. 5(b) and 5(c) have been omitted from these drawings.

As shown in FIG. 5(a), the original image displayed on the display screen off the display unit 16 is a bar graph having four bar elements a-d arranged along the horizontal axis and values ranging from 0 to 40 on the vertical axis.

The graph includes an outer frame 300 configured of a thick black line. The bar elements a-d are filled and blue in color. Horizontal lines indicating the numerical values for the vertical axis include black lines 301 corresponding to the values 10, 20, and 30, and red lines 302 alternating with the black lines 301.

First, the example of printing this data according to the normal printing process without replacing line data will be described with reference to FIG. 5(b).

Figure 5B:
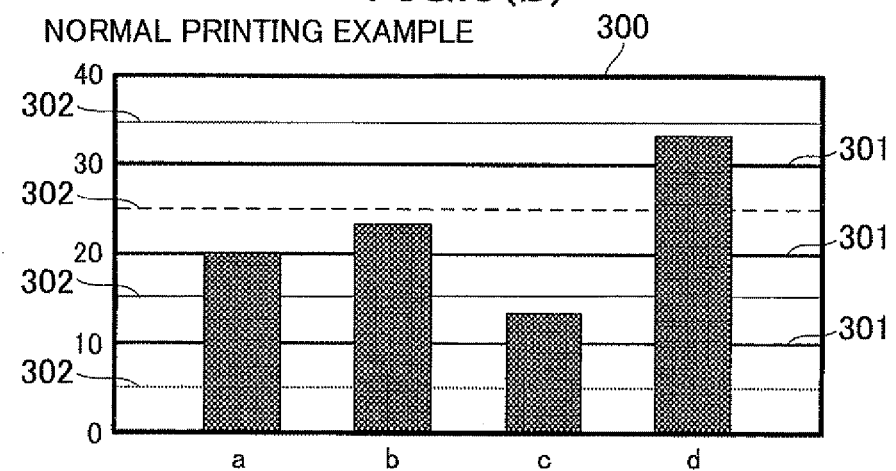

As shown in FIG. 5(b), since the outer frame 300 and lines 301 are black lines, these lines are printed in black using the dither matrix. However, since the bar elements a-d are blue in color, which is lighter than black, these elements are printed in a lattice pattern using a dither matrix.

Since the lines 302 are red, the lines formed according to the dither matrix differ based on the superposed position of the matrix. In this example, the uppermost line 302 is printed identical to the original image, but the next lower line 302 is printed as a dashed line, the next lower line 302 is printed identical to the original line, and the lowest line 302 is printed as a dotted line.

In other words, when printing color print data monochromatically using a dither matrix, lines other than black lines are often drawn differently, even among lines of the same color.

Next, the process for printing after replacing line data will be described with reference to FIG. 5(c). In this example, it will be assumed that "+1 pt solid line" of is line number 0 has been selected for the outer frame 300, "1 pt solid line" of line number 1 has been selected for the lines 301, and "1 pt dashed line" of line number 2 has been selected for the lines 302.

Figure 5C:
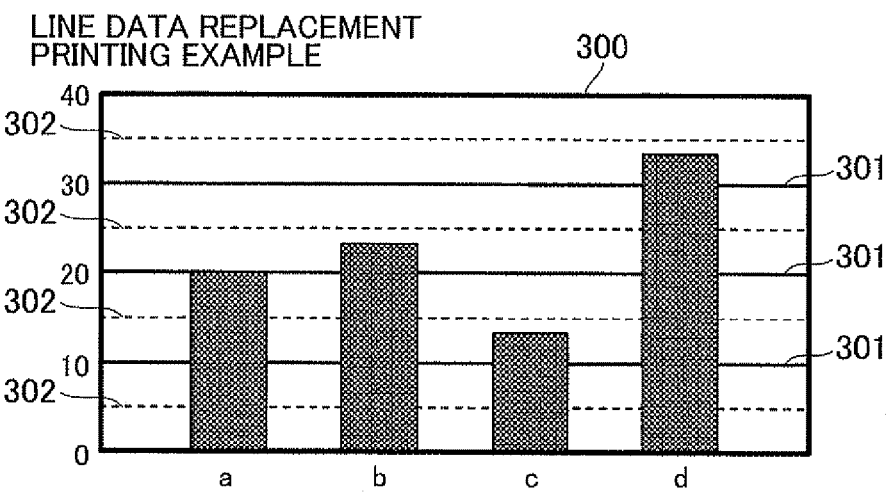

As shown in FIG. 5(c), the outer frame 300, lines 301, and lines 302 are replaced with a "+1 pt solid line," a "1 pt solid line," and a "1 pt dashed line," respectively, before printing, thereby printing the outer frame 300 as a thick solid line (bold solid line), the lines 301 as thin solid lines (solid lines narrower than the bold solid line), and the lines 302 as thin dashed lines. Since the specific line data to be printed is selected according to the density or tone of the lines, the same specific line data is used for lines of the same color.

As described above, the PC 10 can select and print specific line data corresponding to tone values of line data when the line data replacement mode is selected and the multi-level tone print data includes line data designated by the instructions for drawing line data. Hence, the PC 10 can convert print data including color line data to print data including monochromatic line data with regularity, enabling the user to reliably distinguish the specific line data. Further, since monochromatic lines are rendered by filling in the entire dither matrix or by not filling the dither matrix entirely, these lines can be reliably printed as illustrated in FIG. 5(c).

Further, multi-level tone color print data is converted to 256-level tone monochromatic data having a tone value in the range of 0 to 255. 26 types of specific line data having the line numbers 0-25 are stored in the specific line data table 12a in correspondence with 256 tone values ranging from 0 to 255, thereby reducing the number of the is line types. This is preferable since a large storage area would be required to store 256 types of specific line data corresponding to the 256 tone values. Further, it would be difficult to draw 256 types of lines in a way that the lines could be distinguished from one another in monochromatic printing.

Dividing the tone value by 10 to obtain one of 26 numbers n from 0 to 25 avoids this enormous amount of storage volume, eliminating the need for an expensive storage device that can increase the overall cost of the PC 10. Further, since the PC 10 of the embodiment can use the same specific line data for line data having similar tone values and different specific line data for lines having different tone values, the user can easily perceive the differences in lines of the original image, even in monochromatic printing. Specifically, the PC 10 can employ solid lines, dashed lines, and dotted lines according to the tone values of the line data, where thicker lines are used for lower color tone values (closer to black or darkest) and thinner lines are used for higher tone values (closer to white or lightest), enabling the user to clearly differentiate the printed line data.

By providing the input device 15 with the mode switch 15*a*, the user can select either the line data replacement mode or the normal mode, thereby providing an image-forming system with expanded options for the user.

Next, a second embodiment of the present invention will be described while referring to FIGS. 6(*a*)-7.

In the first embodiment described above, the PC 10 finds a number n assigned to drawn lines in order to obtain a correlation between lines drawn according to line drawing commands and the corresponding replacement lines. However, in the present embodiment, lines are sorted into several groups, as shown in FIG. 6(*a*), and each line is replaced with specific line data associated with a corresponding group as shown in FIGS. 6(*b*)-6(*d*).

Specifically, a plurality of line colors are grouped according to their tones or densities in order from darkest to lightest, as shown in FIG. 6(*a*). As shown in FIGS. 6(*b*)-6(*d*), numbers are assigned to lines within each group in order from darkest to lightest, and specific line data is set in association with the assigned line numbers.

FIG. 6(*a*) conceptually illustrates a table of groups sorted based on line colors, and FIG. 6(*b*)-6(*d*) illustrate specific line data tables corresponding to the respective groups.

FIG. 6(*a*) is a group table showing the groups Group 1 (G1), Group 2 (G2), and Group 3 (G3) assorted according to line colors. FIG. 6(*b*) shows a specific line data table for Group 1 (G1), FIG. 6(*c*) a specific line data table for Group 2 (G2), and FIG. 6(*d*) a specific line data table for Group 3 (G3). It is noted that a dashed-and-dotted line appearing in the specific line data table of FIG. 6(*d*) is a line that is formed from line segments, dots, and spaces. According to the present embodiment, the group table of FIG. 6(*a*) and the specific line data tables for Groups G1, G2, and G3 shown in FIGS. 6(*b*)-6(*c*) are stored in the ROM 12 in place of the specific line data table 12*a* of FIG. 2.

Line groups will be described next with reference to FIG. 6(*a*).

As shown in FIG. 6(*a*), groups G1-G3 are assigned based on tones or densities of the line colors. Dark colors, such as black, red, blue, and the like, that have dark tones or densities, are assigned to group G1, intermediate colors such as pink and the like having intermediate tones or densities to group G2, and lighter colors such as yellow and the like having lighter tones or densities to group G3.

In addition, in the group table of FIG. 6(*a*), all the line colors belonging to group G1 are arranged in an order from the darkest to the lightest. For example, black, red, blue, and other colors are arranged in this order based on the relationship of line color tones or densities of black>red>blue>others. While not shown in this drawing, each of the groups G2 and G3 also includes a plurality of line colors that are arranged in order of the densities (tones) of the line colors.

According to the second embodiment, the line data replacement printing process of S105 is executed as shown in the flowchart of FIG. 7 instead of as shown in FIG. 4.

As in the first embodiment described above, the process of FIG. 7 is executed by the CPU 11 of the PC 10.

In S210 at the beginning of this process, the CPU 11 identifies line data drawn by line drawing commands in the multi-level tone color print data that is acquired in S101 of FIG. 3 and that is stored in the color data storage area 13*a*. That is, similarly to S112 of the first embodiment, the CPU 11 acquires line drawing commands stored in the print command storage area 13*d* and analyzes and identifies portions of multi-level tone color print data (bitmap data) stored in the color data storage area 13*b* drawn according to the line drawing commands.

In S211, the CPU 11 determines whether the line data has been identified. That is, similarly to S113 of the first embodiment, the CPU 11 determines whether there is identified some area (line area) drawn by the line drawing commands.

If the CPU 11 identifies no areas drawn by the acquired line drawing commands (no in S211), then the CPU 11 jumps to S216.

If the CPU 11 identifies some area drawn by the line drawing commands (yes in S211), then the CPU 11 proceeds to S212.

In S212, the CPU 11 converts the one page worth of multi-level tone color print data (bitmap data) stored in the color data storage area 13*a* to 256-level tone monochromatic print data (bitmap data) and stores the converted 256-level tone monochromatic print data in the monochrome data storage area 13*b*. It is noted that portions of the 256-level tone monochromatic print data that are stored in the monochrome data storage area 13*b* and that correspond to the line areas are defined as "line data".

In S213 the CPU 11 sorts all the sets of line data identified in S210 into the plurality of groups G1-G3 based on line color density (tone) of the identified line data, and arranges the line data within the corresponding group in order of the line color density (tone) of the line data. It is noted that the CPU 11 determines line color density (tone) of the identified line data based on the color data included in the corresponding line drawing command. The CPU 11 assigns each set of line data to the name of the group to which the subject set of line data is assigned.

In S214 the CPU 11 assigns a number n to each line data based on the ordered position of the subject line data within the group in which the subject line data is as signed.

In S215 the CPU 11 replaces each line data, stored in the monochrome data storage area 13*b*, with specific line data that is stored in a specific line data table (FIG. 6(*b*), 6(*c*), or 6(*d*)) of the assigned group name and at the assigned number n.

For example, now assume that one page's worth of print data includes line data indicative of a line of color black (which will be referred to "first line data" hereinafter), line data indicative of a line of color red (which will be referred to "second line data" hereinafter), line data indicative of a line of color pink (which will be referred to "third line data" hereinafter), and line data indicative of a line of color yellow (which will be referred to "fourth line data" hereinafter).

In this case, in S213, the first line data and second line data are assigned to the first group G1, the third line data to the second group G2, and the fourth line data to the third group G3. Among all the colors belonging to group G1, only black and red exist in the print data, and black is darker than red as apparent from the group table of FIG. 6(*a*). So, the first line data and the second line data are arranged in this order. In S214, the first line data and the second line data are assigned to line numbers 0 and 1, respectively, in the specific line data table G1. Among all the colors belonging to group G2, only pink exists in the print data. So, the third line data is assigned to line number 0 in the specific line data table G2. Among all the colors belonging to group G3, only yellow exists in the print data. So, the fourth line data is assigned to line number 0 in the specific line data table G3. In S215, the first line data is replaced with specific line data of "+1 pt solid line," associated with line number 0 in the specific line data table of FIG. 6(*b*), and the second line data is replaced with specific line data of "1 pt solid line" associated with line number 1 in the specific line data table of FIG. 6(*b*). The third line data is replaced with specific line data of "1 pt solid line" associated with line number 0 in the specific line data table of FIG. 6(*c*). The fourth line data is replaced with specific line data of "1 pt dotted line" associated with line number 0 in the specific line data table of FIG. 6(*d*).

In S216 the CPU 11 binarizes the 256-level tone monochromatic print data stored in the monochrome data storage area 13*b* using the dither matrix in the same manner as the process of S117 in the first embodiment.

Next, in the same manner as the processes of S118 and S119 in the first embodiment, the CPU 11 transmits in S217 the binarized print data stored in the monochrome data storage area 13*b* to the printer 50, in S218 executes a printing operation, and subsequently ends the line data replacement printing process.

As shown in FIGS. 6(*b*)-6(*d*), the group for dark line colors (G1) has thicker lines than the group for light colors (G3). Further, line colors in group G1 are more likely to produce solid lines than line colors in group G3.

As a result of the grouping in FIGS. 6(*a*)-6(*d*), line data is sorted according to color density, and line data within each group is arranged in order of color density, as well, with line numbers assigned sequentially to the ordered arrangement. Since the specific line data associated with the assigned line numbers is set with reference to the specific line data tables for G1-G3, specific line data can be reliably set based on the line color density.

Further, since line numbers are assigned in order of line color density (tone) and specific line data is set with reference to the specific line data tables for G1-G3, the PC 10 can set different specific line data for lines in the print data having similar color densities, for example, thereby clearly distinguishing different line colors in the original image.

Further, line numbers are assigned in order of line color density, and thicker solid lines are associated with specific line data tables with smaller group numbers and smaller line numbers within each group. Accordingly, lines having colors associated with smaller group numbers and smaller line numbers are more likely to be rendered in thick solid lines that are more visible when printed.

Since lines are grouped based on line color density, line data expressed in starkly different line color densities can be sorted into different groups. Accordingly, since line data having starkly different line color densities can be set to different specific line data, the user can more easily distinguish the differences in line color density.

While the invention has been described in detail with reference to the embodiments thereof, it would be apparent to those skilled in the art that various changes and modifications may be made therein without departing from the spirit of the invention.

For example, in the above-described embodiments, the printer 50 is configured to print monochromatic images of black and white. However, the printer 50 may print monochromatic images of colors other than black and white. Even in such a case, the specific lines can be rendered by filling in the entire dither matrix (and by not filling the dither matrix entirely), these lines can be reliably printed.

In the embodiments described above, when print data includes drawing commands instructing the printing of lines, specific line data corresponding to the color density is set. However, if the background color is not white, the specific line data may be set based on relationship between the density of the background color and the density of the line color. For example, specific line data may be set based on the difference between the tone value of the line data and the tone value of the background color.

In the above-described embodiments, print data transmitted from the application is color print data expressed in multi-level tones. However, the print data transmitted from the application may be monochromatic data expressed in multi-level tones. In this case, the process of S111 for converting color data into monochromatic data can be omitted from the process of FIG. 4. Similarly, the process of S212 for converting color data into monochromatic data can be omitted from the process of FIG. 7.

Further, while the PC 10 executes the process of FIGS. 3 and 4 or 7 in the embodiments described above, the printer 50 may be configured to execute the process shown in the flowcharts of FIGS. 3 and 4 and 7.

In the embodiments described above, the PC 10 converts multi-level tone color data to multi-level tone monochromatic data, before replacing line data in the converted multi-level tone monochromatic data with specific line data. However, the PC 10 may replace line data in the multi-level tone color data with specific line data instead.

More specifically, the process of S105 is modified to replace line data in the multi-level tone color data stored in the color data storage area 13*a* with specific line data, before being binarized by using a dither matrix. The binarized color data is transmitted to the printer 50 and printed by the printer 50. In this case, the process of S111 is omitted from FIG. 4. The processes of S112 and S116-S118 are executed on the multi-level tone color data stored in the color data storage area 13*a*, instead of the multi-level tone monochromatic data stored in the monochrome data storage area 13*b*. As a result, print data is printed by the printer 50 in color, rather than monochromatically.

Similarly, the normal printing process of S106 may be modified to print the print data in color, rather than in monochrome. In this case, in S106, the multi-level tone color data stored in the color data storage area 13*a* is binarized by using a dither matrix, and is transferred to the printer 50.

Types of the specific lines are not limited to solid lines, dashed lines, dotted lines, and dashed-and-dotted lines. The specific lines can be of any other various types, provided that the specific lines are formed from pixels having black or darkest tone or are formed from pixels having black or darkest tone and pixels having white or lightest tone.

In the embodiments described above, the specific line data is prepared to indicate a specific line that has the smallest tone value (black or darkest). However, the specific line may not be limited to have the smallest tone value (black or darkest), but may have a tone value greater or lighter than the smallest or darkest tone value. For example, the specific line may have a tone value that falls within a range of 10% from the minimum value. That is, the specific line may have a tone value falling within a range of 0 (minimum or darkest) to 25 when the tone value is defined as a multilevel value in the range of 0 to 255 as in the above-described embodiments. That is, the specific line data of a solid line type may indicate that all the pixels making up the line have a multi-level tone value in the range of 0 to 25. The specific line data of a dashed line type and dotted line type may indicates that pixels making up the line segments or dots have a multi-level tone value in the range of 0 to 25 and that pixels making up the spaces between the line segments or dots have a multi-level tone value of 255.

Similarly, in the embodiments described above, the specific line data indicative of a dotted line or a dashed line is prepared to have the largest tone value (white or lightest) for the spaces between the line segments or dots. However, the specific line data indicative of a dotted line or a dashed line may not be limited to have the largest tone value (white or lightest), but may have a tone value smaller or darker than the largest or lightest tone value. For example, the specific line of a dashed line type and dotted line type may have a tone value that falls within a range of 10% from the maximum value. That is, the specific line of a dashed line type and dotted line type may have a tone value falling within a range of 255 (maximum or lightest) to 230 when the tone value is defined as a multilevel value in the range of 0 to 255 as in the above-described embodiments. That is, the specific line data of a dashed line type and dotted line type may indicate that pixels making up the line segments or dots have a multi-level tone value in the range of 0 to 25 and that pixels making up the spaces between the line segments or dots have a multi-level tone value of 230 to 255.

In the second embodiment described above, three groups G1-G3 are defined based on the line color density. However, the total number of the groups is arbitrary.

In the process of FIG. 7, the process of S212 may be executed immediately after S213 or S214.

In the first embodiment, the specific line data table 12a stores 26 sets of specific line data in association with 26 line numbers of 0 to 25. However, the total number of the sets of specific line data stored in the specific line data table 12a, that is, the total number of the line numbers, is not limited to 26. In S115, the tone value is divided by such a number that can properly associate the tone value to one of the line numbers.

What is claimed is:

1. An image-processing method comprising:
    acquiring multi-level tone print data expressed in multi-level tones;
    determining whether the acquired multi-level tone print data includes line data indicative of a line having an original tone and a combination of a first line type and a first line thickness;
    replacing, if the print data includes the line data, the line data indicative of the line having the original tone and the combination of the first line type and the first line thickness with specific line data indicative of a prescribed line having a prescribed tone and a combination of a second line type and a second line thickness corresponding to the original tone of the line data, replacing the line data further comprises selecting, based on the original tone of the line data, one of a plurality of sets of specific line data, which are prestored in association with a plurality of tones and which have a plurality of prescribed combinations of the second line type and the second line thickness and the prescribed tone value, and replacing the line data with the selected one set of specific line data; and
    converting the multi-level tone print data to binary data after replacing the line data with the specific line data.

2. An image-processing method according to claim 1, wherein the multi-level tone print data is multi-level tone color print data.

3. An image-processing method according to claim 1, wherein the specific line data indicates a line having a tone value falling within a first tone range in a prescribed range of the multi-level tones, the first tone range extending from a predetermined minimum tone value to a first tone value within the prescribed range, the first tone value being higher than the minimum tone value, the first tone range including 10% of the entire part of the prescribed range.

4. An image-processing method according to claim 1, wherein the specific line data indicates a line having a predetermined minimum tone value within a prescribed range of the multi-level tones.

5. An image-processing method according to claim 1, wherein the specific line data indicates a line having a tone value falling within a first tone range in a prescribed range of the multi-level tones and another tone value falling within a second tone range in the prescribed range of the multi-level tones, the first tone range extending from a predetermined minimum tone value to a first tone value within the prescribed range, the first tone value being higher than the minimum tone value, the first tone range including 10% of the entire part of the prescribed range, the second tone range extending from a predetermined maximum tone value to a second tone value within the prescribed range, the second tone value being lower than the maximum tone value, the second tone range including 10% of the entire part of the prescribed range.

6. An image-processing method according to claim 1, wherein the specific line data indicates a line having a predetermined minimum tone value and a predetermined maximum tone value within a prescribed range of the multi-level tones.

7. An image-processing method according to claim 1, wherein it is determined that the acquired multi-level tone print data includes line data by determining whether the acquired multi-level tone print data includes data that is created based on a line drawing command instructing that a line be drawn.

8. An image-processing method according to claim 2, further comprising converting the multi-level tone color print data to multi-level tone monochromatic print data.

9. An image-processing method according to claim 1, wherein the multi-level tone print data is converted to binary data using a dither matrix.

10. An image-processing method according to claim 1, wherein the specific line is a solid line.

11. An image-processing method according to claim 1, wherein the specific line is a dashed line.

12. An image-processing method according to claim 1, wherein the specific line is a dotted line.

13. An image-processing method according to claim 1, wherein the replacing the line data includes:
    acquiring a tone value indicative of the original tone of the line data;
    converting the tone value of the acquired line data to a numeral value that falls within a prescribed numeral range and that corresponds to the tone value; and
    assigning the converted numeral value to one of a plurality of divisions of the prescribed numeral range, a plurality of sets of specific line data being associated with the plurality of divisions, respectively; and replacing the line data by one set of specific line data that is associated with the one division, into which the converted numeral value is assigned.

14. An image-processing method according to claim 1, wherein the replacing the line data includes:
   acquiring all sets of line data included in the print data; and
   ordering all the sets of line data based on the original tones of the line data; and
   converting the line data to the specific line data based on the order of the sets of line data.

15. An image-processing method according to claim 1, wherein replacing the line data includes replacing the line data of a lower-tone with specific line data for a thicker line and replacing the line data of a higher tone with specific line data for a thinner line.

16. A non-transitory computer readable medium storing a set of program instructions executable on a data processing device, instructions comprising:
   acquiring multi-level tone print data expressed in multi-level tones;
   determining whether the acquired multi-level tone print data includes line data indicative of a line having an original tone and a combination of a first line type and a first line thickness;
   replacing, if the print data includes the line data, the line data indicative of the line having the original tone and the combination of the first line type and the first line thickness with specific line data indicative of a prescribed line having a prescribed tone and a combination of a second line type and a second line thickness corresponding to the original tone of the line data, replacing the line data further comprises selecting, based on the original tone of the line data, one of a plurality of sets of specific line data, which are prestored in association with a plurality of tones and which have a plurality of prescribed combinations of the second line type and the second line thickness and the prescribed tone value, and replacing the line data with the selected one set of specific line data; and
   converting the multi-level tone print data to binary data after replacing the line data with the specific line data.

17. An image-processing device comprising:
   an multi-level tone print data acquiring unit that acquires multi-level tone print data expressed in multi-level tones;
   a determining unit that determines whether the acquired multi-level tone print data includes line data indicative of a line having an original tone and a combination of a first line type and a first line thickness;
   a replacing unit that replaces, if the print data includes the line data, the line data indicative of the line having the original tone and the combination of the first line type and the first line thickness with specific line data indicative of a prescribed line having a prescribed tone and a combination of a second line type and a second line thickness corresponding to the original tone of the line data, replacing the line data further comprises selecting, based on the original tone of the line data, one of a plurality of sets of specific line data, which are prestored in association with a plurality of tones and which have a plurality of prescribed combinations of the second line type and the second line thickness and the prescribed tone value, and replacing the line data with the selected one set of specific line data; and
   a converting unit that converts the multi-level tone print data to binary data after replacing the line data with the specific line data.

18. An image-processing method according to claim 2, wherein the specific line data is indicative of a monochrome line.

19. A non-transitory computer readable medium according to claim 16, wherein the multi-level tone print data is multi-level tone color print data, and the specific line data is indicative of a monochrome line.

20. An image-processing device according to claim 17, wherein the multi-level tone print data is multi-level tone color print data, and the specific line data is indicative of a monochrome line.

* * * * *